United States Patent
Kobayashi et al.

(10) Patent No.: US 6,424,495 B1
(45) Date of Patent: Jul. 23, 2002

(54) FLYING HEAD SLIDER AND RECORDING DISK DRIVE EMPLOYING THE SAME

(75) Inventors: Takuya Kobayashi; Masahiro Kozaki; Masahiro Ozeki, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/475,770

(22) Filed: Dec. 30, 1999

(30) Foreign Application Priority Data

Jun. 16, 1999 (JP) .......................................... 11-169121

(51) Int. Cl.[7] .................... G11B 21/21; G11B 17/32; G11B 5/60
(52) U.S. Cl. .................... 360/236.5; 360/235.7
(58) Field of Search .................... 360/235.2, 235.7, 360/236.5, 236.6, 237.1

(56) References Cited

U.S. PATENT DOCUMENTS

| | | | | |
|---|---|---|---|---|
| 5,625,512 A | * | 4/1997 | Smith ........................ | 360/103 |
| 5,831,792 A | * | 11/1998 | Ananth ...................... | 360/103 |
| 5,909,340 A | * | 6/1999 | Lairson et al. .............. | 360/104 |
| 5,986,851 A | * | 11/1999 | Angelo et al. .............. | 360/103 |
| 6,023,394 A | * | 2/2000 | Ito et al. .................... | 360/103 |
| 6,038,101 A | * | 3/2000 | Yoda et al. ................. | 360/103 |
| 6,144,529 A | * | 11/2000 | Wada et al. ............... | 360/236.1 |
| 6,198,600 B1 | * | 3/2001 | Kitao et al. ............... | 360/235.2 |

FOREIGN PATENT DOCUMENTS

| | | | |
|---|---|---|---|
| JP | 9245451 | | 9/1997 |
| JP | 10011931 | | 1/1998 |
| JP | 10247368 | | 9/1998 |
| JP | 11-16315 | * | 1/1999 |
| JP | 11-191276 | * | 7/1999 |
| JP | 11-203813 | * | 7/1999 |

* cited by examiner

*Primary Examiner*—William Klimowicz
(74) *Attorney, Agent, or Firm*—Greer, Burns & Crain, Ltd.

(57) ABSTRACT

A flying head slider often comprises support projections defining the top ends higher than the level of an air bearing surface opposed to the surface of a recording disk. The support projections serve to reduce adsorption or effect of meniscus acting on the slider seated on the disk. The slider further comprises an adsorption prevention protrusion formed on a transducer protection layer superposed on the outflow end of a slider body. The adsorption prevention protrusion swells from a medium-opposed surface at which a transducer element is exposed. When the slider inclines downstream around the tip end of the support projection in response to a reverse rotation of the disk, the slider allows the adsorption prevention protrusion to first contact the surface of the disk at the outflow end. Enlargement of the contact area can be avoided between the slider and the surface of the disk. The adsorption or effect of meniscus cannot be intensified between the slider and the surface of the disk. Less torque of a spindle motor, connected to the disk, still allows the disk to normally start rotating.

10 Claims, 4 Drawing Sheets

FLYING HEAD SLIDER AND RECORDING DISK DRIVE EMPLOYING THE SAME

BACKGROUND OF THE INVENTION

1. Field of the Invention

The present invention relates to a flying head slider in general employed in a recording disk drive such as a hard disk drive (HDD), and in particular, to a flying head slider comprising a slider body, an air bearing surface (ABS) defined on the slider body, and a support projection defining the tip end higher than the level of the air bearing surface.

2. Description of the Prior Art

A flying head slider is well known in the technical field of magnetic disk drives or magnetic data storage systems, for example. The flying head slider is designed to fly above the surface of the magnetic recording disk when the flying head slider receives an airflow, induced along the surface of the rotating magnetic recording disk, at an air bearing surface. Such flying head slider is often seated on the surface of the magnetic recording disk when the recording disk drive is out of operation, namely, the magnetic recording disk stands still. This is called a contact start stop (CSS) control. In the CSS control, the flying head slider suffers from adsorption induced between the flying head slider and the lubricating agent or oil spread over the surface of the magnetic recording disk. The adsorption sometimes obstructs the rotation of the magnetic recording disk. The magnetic recording disk cannot even start rotating.

A flying head slider is proposed to comprise support projections or pads formed on the air bearing surface opposed to the surface of the magnetic recording disk. The support projections serve to keep the air bearing surface above the surface of the magnetic recording disk when the magnetic recording disk stands still. The flying head slider thus contacts the magnetic recording disk over a less contact area. Less adsorption from the lubricating agent may act on the flying head slider seated on the magnetic recording disk.

It is a trend in the field of magnetic disk drives to employ a so-called Hall-less motor as a spindle motor for driving the magnetic recording disk. No Hall element is employed in the Hall-less motor. The Hall-less motor accordingly controls the amount of rotation for the rotor without monitoring or detecting the rotational angle or position of the rotor. The Hall-less motor sometimes suffers from a reverse rotation of the rotation axis when the rotor starts rotating.

The aforementioned flying head slider takes an inclined attitude during flight, making the outflow end or trailing edge closer to the surface of the magnetic recording disk. Accordingly, it is necessary to position the support projections far from the outflow end of the slider body so as to prevent collision between the support projections and the magnetic recording disk during the flight. Such disposition of the support projections causes inclination of the slider body about the tip ends of the support projections when the magnetic recording disk makes a reverse rotation at the beginning of the rotation. The inclination causes the slider body to contact the surface of the magnetic recording disk at the outflow end in addition to the support projections. The effect of meniscus between the slider body and the magnetic recording disk is intensified so that a larger adsorption is caused between the slider body and the magnetic recording disk. The magnetic recording disk sometimes cannot even start rotating in this situation, because a recent spindle motor transmits less torque to the magnetic recording disk.

SUMMARY OF THE INVENTION

It is accordingly an object of the present invention to provide a flying head slider allowing a recording disk to normally start to rotate even when a spindle motor causes a reverse rotation.

According to a first aspect of the present invention, there is provided a flying head slider comprising: a slider body; a transducer protection layer superposed on an outflow end of the slider body; a transducer element embedded in the transducer protection layer so as to expose its tip end at a medium-opposed surface; and an adsorption prevention protrusion formed on the transducer protection layer so as to swell from the medium-opposed surface.

The flying head slider of this type often comprises support pads or projections defining the top ends higher than the level of an air bearing surface defined on the medium-opposed surface, for example. The support projections serve to keep a space between the air bearing surface and the surface of a recording medium or recording disk when the flying head slider is seated on the surface of the recording disk. The air bearing surface fails to contact the surface of the recording disk, so that the contact area can be reduced between the flying head slider and the recording disk. The flying head slider may receive less adsorption or effect of meniscus acting from a lubricating agent or oil or water spread over the surface of the recording disk.

When the flying head slider inclines downstream around the tip end of the support projection in response to a reverse rotation of the recording disk, for example, the flying head slider allows the adsorption prevention protrusion to first contact the surface of the recording disk at the outflow end. Enlargement of the contact area can be avoided between the flying head slider and the recording disk to the utmost. The adsorption or effect of meniscus cannot be intensified between the flying head slider and the recording disk. Less torque of a spindle motor, connected to the recording disk, still allows the recording disk to normally start rotating.

The adsorption prevention protrusion is preferably opposed to a step defined between the slider body and the transducer protection layer at the medium-opposed surface. A groove defined between the adsorption prevention protrusion and the step serves to suppress a lubricating agent or water to be sucked between the flying head slider and the surface of the recording disk. Less adsorption from the lubricating oil or water may act on the flying head slider seated on the surface of the recording disk. Less torque accordingly allows the recording disk to smoothly start rotating without hindrance of the adsorption or effect of meniscus.

In recent years, there is a greater demand to reduce the distance between the transducer element and the surface of the recording disk during flight of the flying head slider so as to further increase the storage density of the recording disk. Such reduction in the distance between the transducer element and the recording disk cannot be achieved without a thinner protection layer, such as a DLC layer, laminated all over the medium-opposed surface, for example. On the other hand, the surface at which the transducer element exposes its tip end is preferably covered with the protection layer of a larger thickness. If the tip end of the transducer element is covered with the adsorption prevention protrusion, a thicker protection layer over the tip end of the transducer element can be achieved while keeping a thinner protection layer laminated over the medium-opposed surface. The transducer element may reliably be protected from corrosion and electrostatic destruction or damage.

Furthermore, according to a second aspect of the present invention, there is provided a flying head slider comprising: a slider body; a support projection disposed on a medium-opposed surface of the slider body so as to define its top end highest in an area upstream of a center of gravity of the slider body; a group of protrusions disposed on the medium-opposed surface of the slider body so as to define top ends, lower than that of the support projection, highest in an area downstream of the center of gravity of the slider body.

The flying head slider of this type reliably prevents the relatively higher support projection to collide against the surface of a recording disk during flight even if the support projection is located near the inflow end. The flying head slider also reliably prevents the relatively lower protrusions to collide against the surface of the recording disk during flight even if the protrusions are located near the outflow end. When the flying head slider is seated on the surface of the recording disk, the support projection is designed to support the slider body at the area upstream of the center of gravity above the surface of the recording disk, while the protrusions are likewise designed to support the slider body at the downstream of the center of gravity. The support projection and the protrusions in cooperation serve to stabilize the attitude of the flying head slider. In case where the recording disk starts rotating, the flying head slider hardly changes its attitude on the recording disk. Even when the recording disk makes a reverse rotation as described above, the adsorption or effect of meniscus can be maintained constant between the flying head slider and the surface of the recording disk.

If the height of the support projection is set larger than that of the protrusions, the flying head slider seated on the surface of the recording disk may take an inclined attitude with the inflow end far from the surface of the recording disk. Only the area around the outflow end suffers from the adsorption or effect of meniscus. However, the protrusions serves to reduce the contact area between the flying head slider and the recording disk at the outflow end, so that the adsorption or effect of meniscus cannot be intensified between the flying head slider and the recording disk. The recording disk may smoothly start rotating.

A laser beam may be employed to form the respective protrusions. Tiny bumps formed by laser beams correspond to the respective protrusions. A laser beam serves to form a tiny bump of a smaller diameter and a lower height as compared with the support projection which is in general formed by sputtering or deposition. It is preferable to form an Ni—P layer or the similar layer over the medium-opposed surface of the slider body prior to radiation of laser beams.

In addition, the protrusions are preferably arranged in a plurality of rows in an upstream direction. When the flying head slider keeps an inclined attitude as described above, the flying head slider may suffer from abrasion growing upstream form the outflow end because of a friction between the flying head slider and the surface of the rotating recording disk. If the protrusions are arranged in the upstream direction in the aforementioned manner, the protrusion upstream of the abraded or removed protrusion still allows the tip end to contact the surface of the recording disk. Such continuous emergence of the upstream protrusions behind the abraded or removed protrusions serves to maintain a constant space or gap between the flying head slider and the surface of the recording disk. Even when the abrasion keeps progressing on the flying head slider, the adsorption or effect of meniscus cannot be intensified between the flying head slider and the surface of the recording disk.

It should be noted that the flying head sliders of the first and second aspects may be employed in a magnetic recording disk drive such as a hard disk drive (HDD), a magneto-optical disk drive, a similar recording medium drive or data storage system, and the like.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
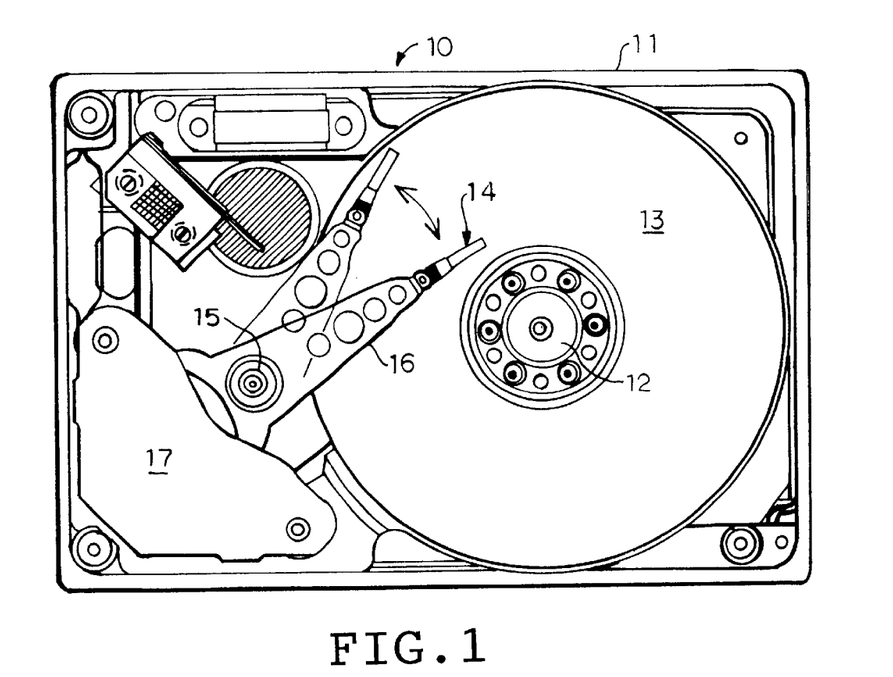
FIG. 1 is a plan view schematically illustrating the structure of a hard disk drive (HDD)

FIG. 1 schematically illustrates the structure of a hard disk drive (HDD) 10 as an example of a recording disk drive. The HDD 10 comprises an enclosure 11 enclosing a magnetic recording disk 13 mounted on a spindle motor 12, and a flying head slider 14 opposed to the surface of the magnetic recording disk 13. The spindle motor 12 serves to drive the magnetic recording disk 13 for rotation about a rotation axis. A Hall-less motor employing no Hall element is, for example, selected as the spindle motor 12.

The flying head slider 14 is fixed at the tip end of a carriage arm 16 capable of swinging about a support axis 15. When information data is written into or read out of the magnetic recording disk 13, an actuator 17 comprising a magnetic circuit is designed to swing the carriage arm 16. The flying head slider 14 is moved in the radial direction of the magnetic recording disk 13. Such radial movement allows the flying head slider 14 to be positioned right above a target recording or data track on the surface of the magnetic recording disk 13. A cover, not shown, may be coupled to the enclosure 11 to define a closed space within the cover and the enclosure 11.

Figure 2:
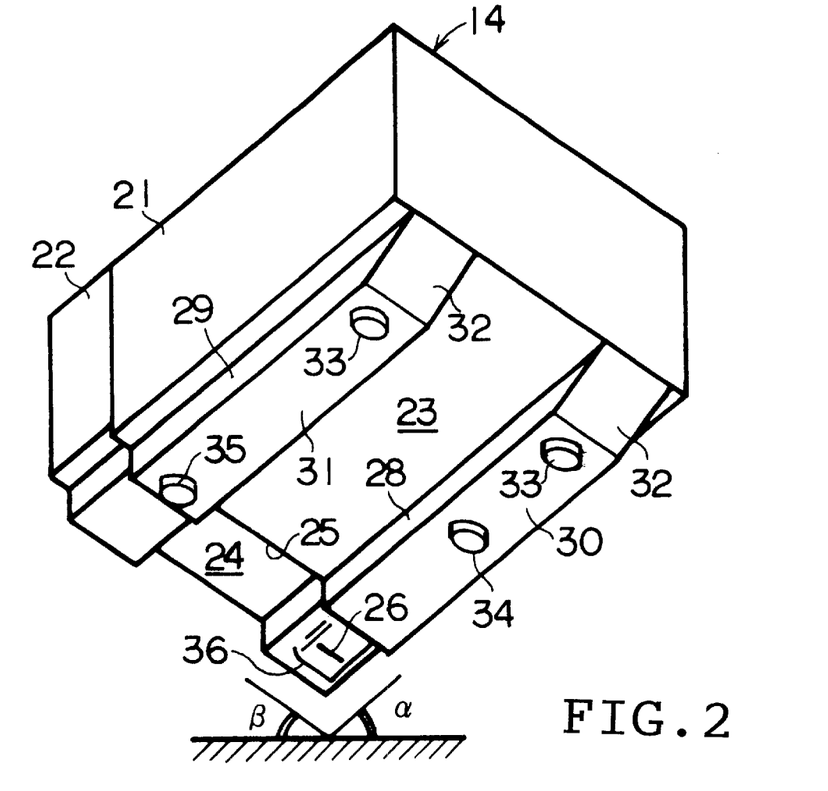
FIG. 2 is an enlarged perspective view schematically illustrating a flying head slider according to a first embodiment of the present invention.

FIG. 2 schematically illustrates the structure of the flying head slider 14 according to a first embodiment of the present invention. The flying head slider 14 comprises an $Al_2O_3$—TiC slider body 21 and an $Al_2O_3$ transducer protection layer 22 superposed on the outflow end or trailing edge of the slider body 21. A magnetic head or transducer element 26 is embedded in the transducer protection layer 22. A medium-opposed surface or bottom surface 23 opposed to the magnetic recording disk 13 is defined at the slider body 21. A medium-opposed surface or bottom surface 24 likewise opposed to the magnetic recording disk 13 is defined at the transducer protection layer 22. The bottom surfaces 23, 24 are connected to each other via a step 25. The transducer element 26 exposes its tip end at the bottom surface 24 defined over the transducer protection layer 22.

First and second rails 28, 29 are formed continuously on the bottom surfaces 23, 24 so as to extend from the inflow end or leading edge to the outflow end or trailing edge. A first air bearing surface 30 is defined on the top surface of the first rail 28. The first air bearing surface 30 is designed to generate a lift by receiving an airflow induced along the surface of the rotating magnetic recording disk 13. A second air bearing surface 31 is likewise defined on the top surface of the second rail 29 so as to generate a lift in the same manner as the first air bearing surface 30. The transducer element 26 is embedded in the first air bearing surface 30 defined over the aforementioned transducer protection layer 22.

An inclined surface 32 at the inflow end allows a larger lift to act on the flying head slider 14 at the upstream side than at the downstream side. Accordingly, the flying head slider 14 keeps an inclined attitude by a pitch angle a during flight. "Pitch angle α" may be referred to as an inclination angle along the longitudinal direction of the flying head slider 14 or in the direction of the airflow.

Moreover, the second air bearing surface 31 is defined broader than the first air bearing surface 30 in the flying head slider 14, for example. Lift generated at the second air bearing surface 31 is accordingly set larger than that at the first air bearing surface 30. The flying head slider 14 thus keeps an inclined attitude by a roll angle β during flight. "Roll angle β" may be referred to as an inclination angle along the lateral direction of the flying head slider 14 or in the direction orthogonal to the airflow. A combination of the pitch angle α and the roll angle β serves to minimize the distance between the flying head slider 14 and the surface of the magnetic recording disk 13 around the transducer element 26. It should be noted that the only pitch angle a may independently be applied to the flying head slider 14, without the roll angle β.

The slider body 21 is provided with a pair of support projections or front adsorption prevention pads 33 standing on the first and second air bearing surfaces 30, 31 near the inflow end, and a pair of support projections or first and second rear adsorption prevention pads 34, 35 standing on the first and second air bearing surfaces 30, 31, respectively, downstream of the first adsorption prevention pads 33. The tip ends or top surfaces of the adsorption prevention pads 33, 34, 35 are defined at a level higher than the first and second air bearing surfaces 30, 31, so that the slider body 21 can be supported above the surface of the magnetic recording disk 13 when the flying head slider 14 is seated on the surface of the still magnetic recording disk 13. The first and second air bearing surfaces 30, 31 are prevented from contacting the surface of the magnetic recording disk 13. The slider body 21 thus receives an adsorption from a lubricating agent or oil, spread over the surface of the magnetic recording disk 13, only via the adsorption prevention pads 33, 34, 35.

The front adsorption prevention pads 33 are located closest to the inflow end of the slider body 21. On the other hand, the first and second rear adsorption prevention pads 34, 35 are located far from the outflow end of the slider body 21. Such disposition of the rear adsorption prevention pads 34, 35 allows the transducer element 26 to approach the magnetic recording disk 13 to the utmost, while preventing collision between the rear adsorption prevention pads 34, 35 and the surface of the magnetic recording disk 13, even when the flying head slider 14 keeps an inclined attitude by a pitch angle a in the aforementioned manner. In addition, the first rear adsorption prevention pad 34 is shifted toward the inflow end as compared with the second rear adsorption prevention pad 35. Accordingly, even when the flying head slider 14 keeps an inclined attitude by a roll angle P in the aforementioned manner, it is possible to achieve the closest approach of the transducer element 26 to the magnetic recording disk 13 while preventing collision between the first rear adsorption prevention pad 34 and the surface of the magnetic recording disk 13.

Figure 3:
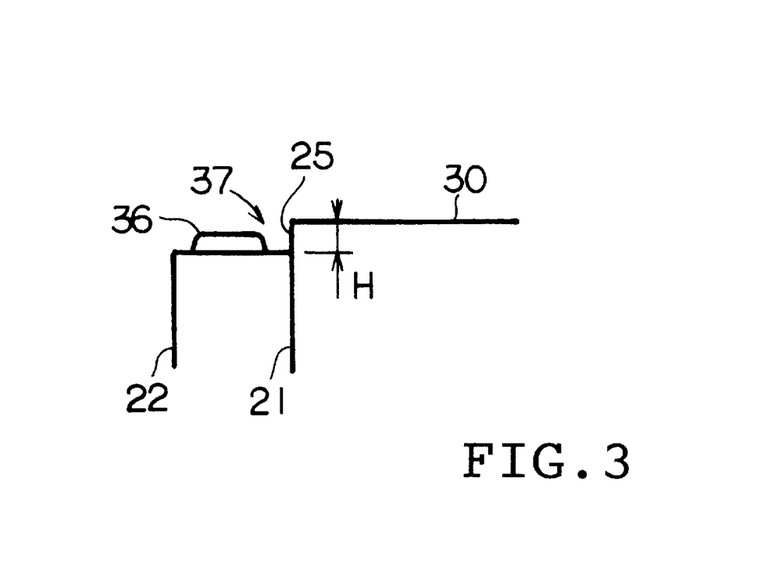
FIG. 3 is a side view schematically illustrating the vicinity of an adsorption prevention protrusion on the flying head slider.

Referring also to FIG. 3, an adsorption prevention protrusion 36 is integrally formed on the first air bearing surface 30 defined over the transducer protection layer 22. The adsorption prevention protrusion 36 covers over the tip end of the transducer element 26. The adsorption prevention protrusion 36 is opposed to the step 25 defined between the slider body 21 and the transducer protection layer 22 in the aforementioned manner. A recess or groove 37 is defined between the adsorption prevention protrusion 36 and the step 25. The height of the adsorption prevention protrusion 36 is preferably set lower than the height H of the step 25.

Figure 4:
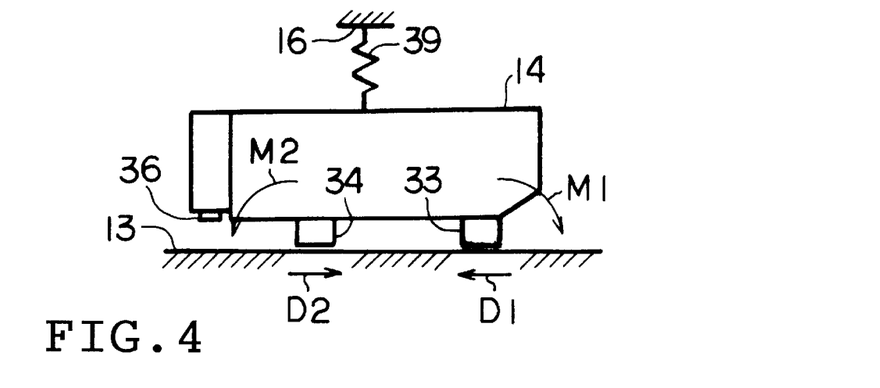
FIG. 4 is a side view schematically illustrating the attitude of the flying head slider at the beginning of rotation of the magnetic recording disk.

Assume that the HDD 10 is out of operation, namely, the magnetic recording disk 13 stands still. As shown in FIG. 4, the flying head slider 14 is seated on the surface of the magnetic recording disk 13. When the HDD 10 receives instructions for writing or reading binary data into or out of the magnetic recording disk 13, the spindle motor 12 drives the magnetic recording disk 13 for rotation. Airflow is induced along the surface of the rotating magnetic recording disk 13. The airflow acts upon the first and second air bearing surfaces 30, 31 to generate a lift of the flying head slider 14. The lift allows the flying head slider 14 to fly above the surface of the magnetic recording disk 13. The flying head slider 14 opposes the transducer element 26 to the surface of the magnetic recording disk 13 during flight so as to allow the transducer element 26 to achieve the writing or reading operation.

In general, the flying head slider 14 is supported at the tip end of the carriage arm 16 via a resilient suspension 39. The rigid carriage arm 16 is adapted to regulate the movement of the flying head slider 14, while the resilient suspension 39 allows the slight movement of the flying head slider 14. When the magnetic recording disk 13 starts rotating, the disk surface below the front adsorption prevention pads 33 moves in the normal direction D1, so that a moment M1 around the tip ends of the front adsorption prevention pads 33 acts on the flying head slider 14. Such moment M1 tries to incline the flying head slider 14 about the tip ends of the front adsorption prevention pads 33. However, the flying head slider 14 hardly inclines upstream irrespective of the moment M1, since the front adsorption prevention pads 33 are located at the inflow end of the slider body 21. Any inclination of the flying head slider 14 can reliably avoided irrespective of the moment M1.

Heretofore, a spindle motor hardly induces a reverse rotation of the rotation axis, namely, a magnetic recording disk, because the spindle motor employs Hall elements to control the rotation of the rotor. The Hall elements are used to detect the rotational position or angle of the rotor or rotation axis. The rotation of the rotor can be precisely controlled based on the detected rotational position or angle. When the magnetic recording disk is expected to start rotating, the relative position can be detected between the magnets of the rotor and the coils of the stator in the spindle motor. Electric current is supplied to the coils in response to the detection, so that it is possible to reliably prevent a reverse rotation of the rotor.

Recently, it is proposed to employ a so-called Hall-less motor, in place of the aforementioned spindle motor, in the HDD 10 so as to achieve the reduction in size of a spindle motor by omitting Hall elements. The Hall-less motor is designed to supply electric current to the coils of the stator at the beginning of the rotation of the rotor without detecting the relative position between the magnets of the rotor and the coils of the stator. Some of the relative positions cause a reverse rotation of the rotor. The Hall-less motor cannot completely restrain a reverse rotation of the rotor.

If the magnetic recording disk 13 suffers from a reverse rotation at the beginning of the normal rotation, the disk surface below the first and second rear adsorption prevention pads 34, 35 moves in the abnormal or reverse direction D2. Such movement of the disk surface generates a moment M2 around the tip ends of the first and second rear adsorption prevention pads 34, 35 in the direction opposite to the moment M1. The moment M2 easily causes the flying head slider 14 to incline downstream about the tip ends of the first and second rear adsorption prevention pads 34, 35, because the first and second rear adsorption prevention pads 34, 35 are positioned far from the outflow end of the slider body 21, as described above. The inclination causes the slider body 21 to contact the surface of the magnetic recording disk 13 at the outflow end.

According to the flying head slider 14 of the first embodiment, the adsorption prevention protrusion 36 serves to reduce the contact area between the flying head slider 14 and the surface of the magnetic recording disk 13 even when the flying head slider 14 is seated on the surface of the magnetic recording disk 13 at the outflow end upon the reverse rotation of the disk 13. In addition, the groove 37 between the adsorption prevention protrusion 36 and the slider body 21 serves to suppress the lubricating agent to be sucked between the slider body 21 and the surface of the magnetic recording disk 13. Less adsorption may act on the flying head slider 14 seated on the surface of the magnetic recording disk 13. The adsorption or effect of meniscus is not intensified between the flying head slider 14 and the magnetic recording disk 13. Less torque of the spindle motor 12 still allows the magnetic disk 13 to normally start rotating.

Next, the description will briefly be made on a method of producing the aforementioned flying head slider 14. First of all, a plurality of transducer elements are formed on the surface of an $Al_2O_3$ layer overlaid all over the surface of an $Al_2O_3$—TiC wafer, as conventionally known. Each transducer element is located within a block which is to be cut off into a single flying head slider 14. For example, 1000×100= 10,000 flying head sliders 14 in total may be taken out of the single wafer of 5 inches diameter. The transducer elements are thereafter covered with an $Al_2O_3$ protection layer. The transducer elements thus embedded in the $Al_2O_3$ protection layer of approximately 50 μm thickness can be obtained in this manner.

After the formation of the transducer elements has been completed, rows of the aforementioned blocks are then cut off from the wafer into wafer bars, respectively. The exposed surface of the wafer bar is shaped into the bottom surfaces 23, 24 of the flying head slider 14. Thereafter, each block is cut off from the wafer bar into a flying head slider 14.

In general, the exposed surface of the wafer bar is subjected to lapping prior to the figuration of the bottom surfaces 23, 24. Lapping is adapted to expose the tip end of the transducer element 26 at the first air bearing surface 30 defined over the transducer protection layer 22. In the process of lapping, the $Al_2O_3$ protection layer for providing the transducer protection layer 22 is removed at a higher rate than the $Al_2O_3$—TiC wafer for providing the slider body 21 since the $Al_2O_3$ protection layer has a hardness smaller than the $Al_2O_3$—TiC wafer. Accordingly, the step 25 of approximately 4 nm high can be defined at the boundary between the $Al_2O_3$—TiC wafer and the $Al_2O_3$ protection layer. However, the height H of the step 25 may take any values depending upon the lapping rate.

Figure 5A:
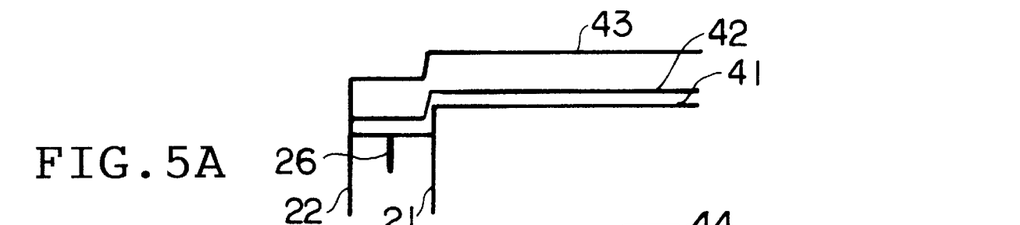
FIGS. 5A to 5D are enlarged partial sectional view of the flying head slider for describing a method of forming the adsorption prevention protrusion.

In figuring the bottom surfaces 23, 24 of the flying head slider 14, as shown in FIG. 5A, a first diamond-like-carbon (DLC) layer 42 of approximately 5nm thickness is formed on the exposed surface 41 of the wafer bar by sputtering or the like. The first DLC layer 42 is overlaid on an Si or SiC adsorption layer of approximately 2 nm thickness covered over the exposed surface 41. Such adsorption layer maybe formed by sputtering, for example. The first DLC layer 42 functions as a protection layer for protecting the exposed surface 42, namely, the bottom surfaces 23, 24. A second DLC layer 43 is overlaid on the surface of the first DLC layer 42 for figuration of the adsorption prevention pads 33, 34, 35. The thickness of the second DLC layer 43 may be set at approximately 30–40 nm, for example. However, the thickness of the second DLC layer 43 may be changed depending upon the height of the adsorption prevention pads 33, 34, 35.

Figure 5B:
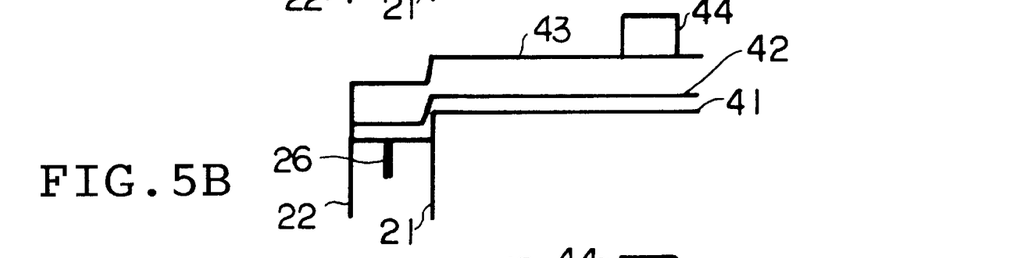

As shown in FIG. 5B, a resist pattern 44 is formed on the second DLC layer 43 for defining contours of adsorption prevention pads 33, 34, 35. The resist pattern 44 may be formed of a filmresist or photoresist, for example. When the second DLC layer 43 is subjected to an etching process, using 02 plasma, for example, the second DLC layer 43 is constantly removed from the surface.

Figure 5C:
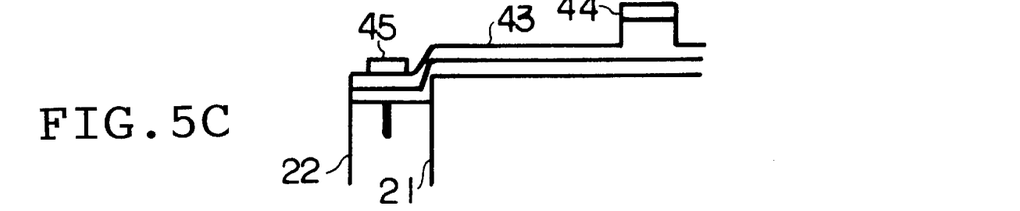
Figure 5D:
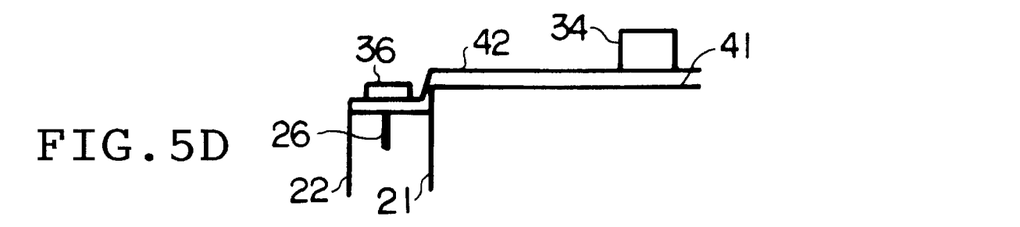

When the second DLC layer 43 has been thinned down to the thickness corresponding to a designed height of the adsorption prevention protrusion 36, the etching process is discontinued. A resist pattern 45 is then formed on the second DLC layer 43 covering over the transducer protection layer 22. The resist pattern 45 is designed to define the contour of the adsorption prevention protrusion 36. The resist pattern 45 may be formed of a filmresist or photoresist, for example. The second DLC layer 43 is thereafter subjected to the etching process again until the first DLC layer 42 is exposed, as shown in FIG. 5D. The second DLC layer 43 is consequently carved into the adsorption prevention projections 33, 34, 35 and the adsorption prevention protrusion 36.

In recent years, there is a greater demand to reduce the distance between the transducer element 26 and the surface of the magnetic recording disk 13 during flight of the flying head slider 14 so as to further increase the storage density of the magnetic recording disk 13 in the field of HDDS, for example. Such reduction in the distance between the transducer element 26 and the magnetic recording disk 13 cannot be achieved without a thinner protection layer for the bottom surfaces 23, 24, namely, the first DLC layer 42 of a smaller thickness. On the other hand, the surface at which the transducer element 26 exposes its tip end is preferably covered with the first DLC layer 42 of a larger thickness. In accordance with the present embodiment, the tip end of the transducer element 26 can be covered with the adsorption prevention protrusion 36 overlaid over the first DLC layer 42. The transducer element 26 can be protected by a thicker protection layer while the bottom surfaces 23, 24 are covered with a thinner protection layer, namely, the first DLC layer 42 only.

Figure 6:
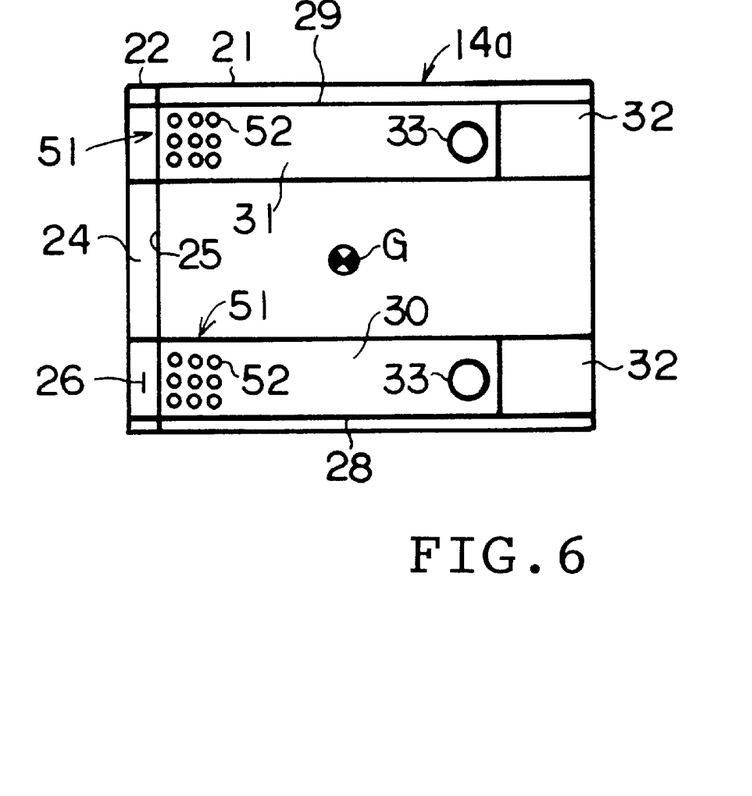
FIG. 6 is a plan view schematically illustrating a flying head slider according to a second embodiment of the present invention.

FIG. 6 schematically illustrates the structure of a flying head slider 14a according to a second embodiment of the present invention. In the following description, the same reference numerals are attached to structures and components achieving similar functions and advantages realized by those of the aforementioned first embodiment. The second embodiment is characterized by a group of protrusions 52, namely, a rugged surface 51 formed on the slider body 21 at the bottom surface 23 near the outflow end, in place of the aforementioned first and second rear adsorption prevention projections 34, 35 and the adsorption prevention protrusion 36. The respective protrusions 52 are arranged in a plurality of rows in the upstream direction. As is apparent from FIG. 6, the protrusions 52 may simultaneously be arranged in rows in the lateral direction of the slider body 21.

The respective protrusions 52 are designed to define the top ends or surfaces highest in the area downstream of the center G of gravity of the flying head slider 14a, although the height of the top ends are set lower than that of the front adsorption prevention projections 33. The height of the protrusions 52 may be set smaller than half the height of the front adsorption prevention projections 33, for example. The outside diameter of the protrusion 52 may be set extremely smaller than that of the front adsorption prevention projections 33.

Figure 7:
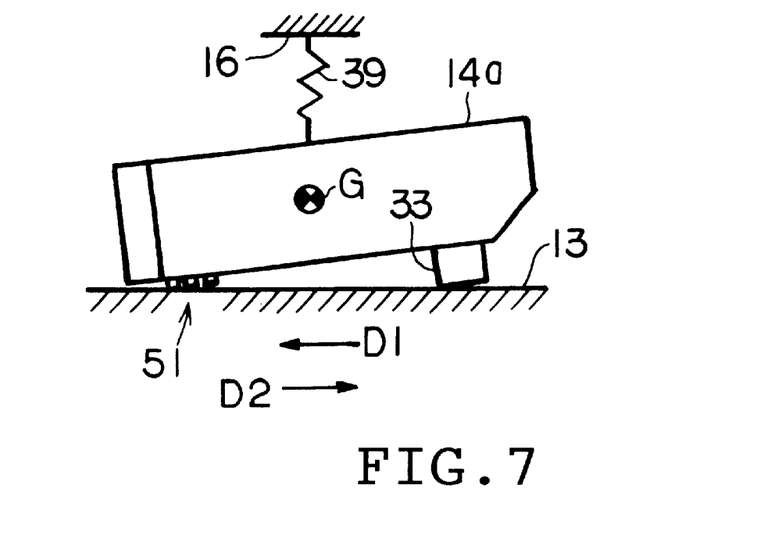
FIG. 7 is a side view schematically illustrating the attitude of the flying head slider seated on the surface of the magnetic recording disk.

When the flying head slider 14a of the second embodiment is seated on the surface of the magnetic recording disk 13, as shown in FIG. 7, the front adsorption prevention projections 33 defining the top ends highest in the area upstream of the center G of gravity are designed to support the slider body 21. The rugged surface 51 defined by the protrusions 52 is likewise designed to support the slider body 21 at the area downstream of the center G of gravity on the surface of the magnetic recording disk 13. The front adsorption prevention projections 33 and the rugged surface 51 in cooperation serve to stabilize the attitude of the flying head slider 14a. Even when the magnetic recording disk 13 makes a reverse rotation, the flying head slider 14a hardly changes its attitude on the magnetic recording disk 13. The adsorption or effect of meniscus may be maintained constant between the slider body 21 and the magnetic recording disk 13 irrespective of rotation of the magnetic recording disk 13.

As is apparent from FIG. 7, the front adsorption prevention projections 33 are formed relatively higher than the protrusions 52 defining the rugged surface 51. The flying head slider 14a may keep an inclined attitude with the inflow end far from the surface of the magnetic recording disk 13. Only the area around the outflow end suffers from the adsorption or effect of meniscus. However, the rugged surface 51 serves to reduce the contact area between the flying head slider 14a and the magnetic recording disk 13 at the outflow end, so that the adsorption or effect of meniscus cannot be intensified between the flying head slider 14a and the magnetic recording disk 13. The magnetic recording disk 13 may smoothly start rotating.

When the magnetic recording disk 13 has started rotating, the flying head slider 14a may slide on the surface of the magnetic recording disk 13. The flying head slider 14a thereafter starts flying by receiving enough airflow induced along the surface of the rotating magnetic recording disk 13. During slide on the magnetic recording disk 13, the front adsorption prevention projections 33 and the protrusions 52 may be abraded in the flying head slider 14a because of the friction against the surface of the magnetic recording disk 13.

Here, the flying head slider 14a of an inclined attitude in the aforementioned manner is expected to accept the abrasion of protrusions 52 advancing upstream from the outflow end. If the protrusions 52 are arranged in the upstream direction as described above, the protrusion 52 upstream of the abraded or removed protrusion 52 still allows the tip end to contact the surface of the magnetic recording disk 13. Such continuous emergence of the upstream protrusions 52 behind the abraded or removed protrusions 52 serves to maintain a constant space or gap between the flying head slider 14a and the surface of the magnetic recording disk 13. Even when the abrasion keeps progressing at the outflow end of the flying head slider 14a, the adsorption or effect of meniscus cannot be intensified between the flying head slider 14a and the surface of the magnetic recording disk 13.

For example, a laser beam may be employed to form the rugged surface 51. It is preferable to form an Ni—P layer or the similar layer over the bottom surfaces 23, 24 in this case. When a laser beam momentarily makes a spot on the Ni—P layer, a tiny protrusion or a so-called laser bump can be formed as conventionally known. Employment of the laser bumps may facilitate the figuration of the rugged surface 51 of the protrusions 52. The Ni—P layer or the like may be formed on the DLC protection layer laminated over the bottom surfaces 23, 24. Otherwise, the Ni—P layer or the like may be covered with the DLC protection layer after radiation of laser beams.

The rugged surface 51 of the second embodiment may be formed by, in place of the protrusions 52, a swelling surface with tiny bottomed bores, or any other means. The rugged surface 51 may be formed on the bottom surfaces 23, 24 in the vicinity of the first and second rails 28, 29 in addition to the first and second air bearing surfaces 30, 31 in the aforementioned manner. Such rugged surface 51 standing on the bottom surfaces 23, 24, namely, the base surface is expected to prevent a lubricating agent or water, spread over the surface of the magnetic recording disk 13, from reaching the slider body 21 of the flying head slider 14a. The adsorption or effect of meniscus can efficiently be reduced.

It should be noted that the aforementioned flying head sliders 14, 14a may be employed in a magneto-optical disk drive, a similar recording medium drive or data storage system, and the like, in addition to a magnetic recording disk drive such as the aforementioned hard disk drive (HDD).

What is claimed is:

1. A flying head slider comprising:
   a slider body defining an air bearing surface;
   a front support projection standing on the air bearing surface near an air inflow end of the slider body, said front support projection including an end tip surface;
   a rear support projection standing on the air bearing surface near an air outflow end of the slider body, said rear support projection including an end tip surface;
   a transducer protection layer superposed on an outflow end surface of the slider body;
   a transducer element embedded in the transducer protection layer so as to expose its tip end at a medium-opposed surface; and
   an adsorption prevention protrusion formed on the transducer protection layer so as to swell from the medium-opposed surface, wherein said adsorption prevention protrusion includes an end tip surface that is located in a different plane than a corresponding plane of at least one of the end tip surface of said front support projection and the end tip surface of said rear support projection.

2. The flying head slider according to claim 1, wherein the adsorption prevention protrusion is opposed to a step defined between the slider body and the transducer protection layer at the medium-opposed surface.

3. The flying head slider according to claim 1, wherein the adsorption prevention protrusion covers over the tip end of the transducer element at the medium-opposed surface.

4. The flying head slider according to claim 1, wherein:
said air bearing surface includes a step near the air outflow end; and
said step and said adsorption prevention protrusion define a groove therebetween,
whereby said adsorption prevention protrusion and said groove are configured and arranged for minimizing a meniscus effect between said flying head slider and a recording disk.

5. The flying head slider according to claim 1, wherein said air bearing surface is defined by:
a first rail extending generally from an area near said air inflow end to an area near said air outflow end; and
a second rail extending generally from an area near said air inflow end to an area near said air outflow end.

6. The flying head slider according to claim 5, further comprising:
at least two of said front projections, wherein at least one of said front projections is positioned upon each of said first and second rails; and
at least two of said rear projections, wherein at least one of said rear projections is positioned upon each of said first and second rails.

7. A recording disk drive comprising:
a recording disk configured and arranged for rotation about a rotation axis;
a flying head slider configured to oppose said recording disk, wherein said flying head slider includes:
a slider body defining an air bearing surface;
a front support projection standing on the air bearing surface near an air inflow end of the slider body, said front support projection including an end tip surface that is configured and arranged to face said recording disk;
a rear support projection standing on the air bearing surface near an air outflow end of the slider body, said rear support projection including an end tip surface that is configured and arranged to face said recording disk;
a transducer protection layer superposed on an outflow end surface of the slider body;
a transducer element embedded in the transducer protection layer so as to expose its tip end at a medium-opposed surface; and
an adsorption prevention protrusion formed on the transducer protection layer so as to swell from the medium-opposed surface, wherein said adsorption prevention protrusion includes an end tip surface that is configured and arranged to face said recording disk, and further wherein said end tip surface of said adsorption prevention protrusion is located in a different plane than a corresponding plane of at least one of the end tip surface of said front support projection and the end tip surface of said rear support projection.

8. The recording disk drive according to claim 7, wherein:
said air bearing surface includes a step near the air outflow end; and
said step and said adsorption prevention protrusion define a groove therebetween,
whereby said adsorption prevention protrusion and said groove are configured and arranged for minimizing a meniscus effect between said flying head slider and said recording disk during reverse rotation of said recording disk.

9. The recording disk drive according to claim 7, wherein, prior to rotation of said recording disk, said plane of said end tip surface of said adsorption prevention protrusion is further from said recording disk than both said plane of said tip end surface of said front projection and said plane of said tip end surface of said rear support projection.

10. The recording disk drive according to claim 7, wherein said air bearing surface is defined by a first rail extending generally from an area near said air inflow end to an area near said air outflow end, and a second rail extending generally from an area near said air inflow end to an area near said air outflow end, and further wherein said flying head slider further includes:
at least two of said front projections, wherein at least one of said front projections is positioned upon each of said first and second rails; and
at least two of said rear projections, wherein at least one of said rear projections is positioned upon each of said first and second rails.

* * * * *